F. H. WILBY.
Device for Making Watch Case Bezels.

No. 159,238.                                         Patented Jan. 26, 1875.

Witnesses
Thomas J. Bewley.
Isaac Rindge.

Inventor
Fritz H. Wilby
By His Attorney
Stephen Ustick

UNITED STATES PATENT OFFICE.

FRITZ H. WILBY, OF PHILADELPHIA, PENNSYLVANIA.

IMPROVEMENT IN DEVICES FOR MAKING WATCH-CASE BEZELS.

Specification forming part of Letters Patent No. 159,238, dated January 26, 1875; application filed December 4, 1874.

*To all whom it may concern:*

Be it known that I, FRITZ H. WILBY, of the city and county of Philadelphia, in the State of Pennsylvania, have invented an Improvement in Watch-Case Combination Chucks, of which the following is a specification:

My invention consists of a chuck on which the bezel of a watch-case is formed, in combination with a clamping-ring connected therewith by means of a screw-thread, to hold the back upon the chuck during the formation of the bezel.

The ordinary mode of making the front bezel or glass rim is to join the ends of a bar together, and form a ring, which has to be turned up to the proper configuration. But with my improved chuck I turn the central portion out of a back, and then press the inner edge of the circumferential portion down upon the chuck to form the bezel, the central portion being used for the inside cap. The work is performed much more expeditiously than by the old mode, with greater accuracy, and with the saving of a large amount of material.

Figure 1:
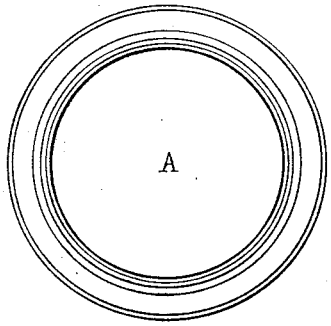
Figure 2:
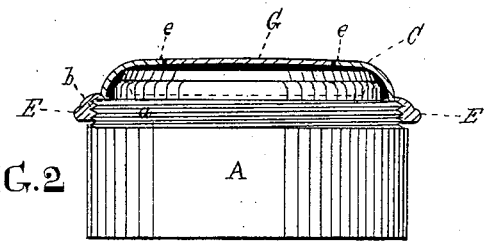
Figure 3:
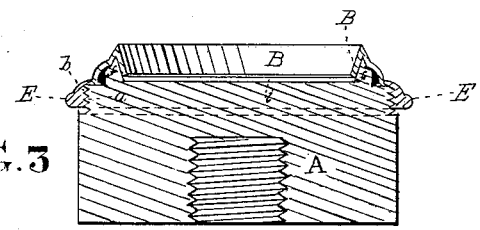

In the accompanying drawings, Figure 1 is a face view of the chuck A for making the bezel or glass rim B. Fig. 2 is an edge view of the same, having a back, C, and clamping-ring E, in connection therewith. Fig. 3 is a cross-section through the chuck A, clamping-ring E, and finished bezel B.

Like letters of reference in all the figures indicate the same parts.

A is a chuck for shaping and finishing the bezel B, represented in Fig. 3. C is a back, shown in Fig. 2, out of which the bezel is made. E is a clamping-ring for confining the back C upon the chuck A, which has a screw-thread, $a$, with which the thread $b$ is connected.

The back C is placed upon the chuck, and the ring E screwed down until it clamps the edge of the back firmly thereon, ready for the shaping process, as seen in Fig. 2. Then a suitable tool is used for cutting out the central part G, which is used for an inside cap. The inner edge of the outer ring-portion is then pressed down by means of a burnisher until the inner edge $e$ fits the circumferential edge $f$ of the recess $i$ of the chuck A, to form the deflector or bezel B, as seen in Fig. 3.

I have shown but one shape for the bezels B, but it will be seen that by varying the shape of the chuck they may be made of any variety of shapes.

I claim as my invention—

The chuck A, in combination with the clamping-ring E, for making the bezel B, substantially as set forth.

FRITZ H. WILBY.

Witnesses:
 THOMAS J. BEWLEY,
 STEPHEN USTICK.